(12) United States Patent
Yamada et al.

(10) Patent No.: US 6,392,867 B1
(45) Date of Patent: *May 21, 2002

(54) ELECTRIC DOUBLE LAYER CAPACITOR AND METHOD FOR PREPARING THE SAME

(75) Inventors: Teruyuki Yamada; Yoshihiko Hosako; Mitsuo Hamada; Tomoyoshi Chiba, all of Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,495

(22) PCT Filed: May 12, 1998

(86) PCT No.: PCT/JP99/02440

§ 371 Date: Jan. 3, 2001

§ 102(e) Date: Jan. 3, 2001

(87) PCT Pub. No.: WO99/59173

PCT Pub. Date: Nov. 18, 1999

(30) Foreign Application Priority Data

May 12, 1998 (JP) ............................................ 10/128739

(51) Int. Cl.[7] ........................... H01G 9/02; H01G 9/022; H01G 9/038

(52) U.S. Cl. ........................ 361/502; 361/504; 361/526; 29/25.03

(58) Field of Search ................................. 361/502, 503, 361/504, 505, 506, 507, 512, 525, 526

(56) References Cited

U.S. PATENT DOCUMENTS 6,114,068 A * 9/2000 Yamada et al. .............. 429/300

FOREIGN PATENT DOCUMENTS

| JP | 63-190318 | 8/1988 | |
| JP | 2-82457 | 3/1990 | |
| JP | 6-20520 | 1/1994 | |
| JP | 6-36972 | 2/1994 | |
| JP | 6-275469 | 9/1994 | |
| JP | 7-320781 | 12/1995 | |
| JP | 10212687 A | * 8/1998 | .......... D21H/13/18 |
| JP | 10-308238 | 11/1998 | |

* cited by examiner

Primary Examiner—Dean A. Reichard
Assistant Examiner—Eric W. Thomas
(74) Attorney, Agent, or Firm—Oblon, Spivak, McClelland, Maier & Neustadt, P.C.

(57) ABSTRACT

An electric double layer capacitor containing a polymer gel electrolyte layer provided between polarizable electrodes, wherein the polymer gel electrolyte layer contains a nonaqueous electrolytic solution, and a fibrous sheet material containing mainly a fiber or pulp material capable of forming a polymer gel with the nonaqueous electrolytic solution.

22 Claims, No Drawings

ELECTRIC DOUBLE LAYER CAPACITOR AND METHOD FOR PREPARING THE SAME

TECHNICAL FIELD

The present invention relates to a safe electric double layer capacitor for power supplies for starting cell motors or as back-up power supplies for hybrid vehicle power supplies or personal computers, etc.

BACKGROUND ART

Electric double layer capacitors, wherein a non-woven fabric of polyethylene or polypropylene or a microporous film is interposed as a separator between two polarized electrodes where an electrode surface is formed on a collector surface using a binder of activated carbon or carbon particles and a polyvinylidene fluoride based polymer or polarized electrodes where aluminum is plasma-deposited on an activated carbon fiber cloth so as to form a conductive layer, and the separator being impregnated with a nonaqueous electrolytic solution, have high output and superior cycle characteristics and thus advances are being made in technology thereof.

When electric double layer capacitors employing non-aqueous electrolytic solution are subjected to high-temperatures, the nonaqueous electrolytes vaporize and the internal pressure of the nonaqueous electrolytes increases so that the shape of the capacitor changes, thereby causing not only changes in the characteristics of the capacitor dramatically but also causing risks of explosions and fire, pausing difficulties with regards to safety management.

A further problem with electric double layer capacitors is that carbon particles produced by such effect of coming apart and the like may move to the opposing electrode when carbon electrodes using activated carbon or carbon particles are employed. Particles produced by the coming apart may then move to the anode side by electromigration and such and thereby causing the leakage current to increase or short-circuits to occur more easily. The migration of particles between electrodes means self-discharge and the ability to prevent migration of particles is substantially related to the fundamental performance of the capacitor.

On the other hand, the degree of difficulty of ionic migration within the electrolytic solution is manifested in the form of liquid resistance, and an increase in this value shows a tendency of difficulty in smooth charging and discharging of the capacitor. It has therefore been necessary to increase the number of holes per unit surface area of the separator in order to reduced the resistance. This can also be achieved by making the separator thin because the fluid resistance can also be lowered by narrowing the distance between the electrodes. Generally, an extremely strongly polarized organic solvent is employed as the electrolyte for an electric double layer capacitor so that a great deal of salt may be dissolved in the solvent, and thus it is necessary that the separator does not react with this solvent or become dissolved by the solvent and also that the electrolyte including the separator must be resistant to mechanical stresses.

Various types of separators have been proposed for such separators. Examples may be found in such as high-density separators referred to as capacitor papers, low-density capacitor paper referred to as electrolytic paper, microporous items substance of polyethelene or polypropelene film, and non-woven fabric using polyethelene or polypropelene fibers. However, in the case of capacitor papers there is high inhibition against the conductivity of the electrolyte thereby making it impossible to obtain the desired electrostatic capacitance and internal resistance, and on the other hand in the case of electrolytic papers, the average pore diameter is greater than the size of the carbon particles and carbon particles therefore pass through the papers whereby the papers could not be made into the desired low leakage current capacitors.

Technology for an electric double layer capacitor with the capacitor having increased fluid retention of the nonaqueous electrolytic solution and with good handling characteristics of the nonaqueous electrolyte layer is disclosed in Japanese Patent Laid-open Publication No. Hei 6-36972.

One of the noticeable features of this capacitor is the use as separators of sustances each having 1 to 20% by weight of acrylic resin particles of a particle diameter of 10 to 100 $\mu$m. In the case of electric double layer capacitors employing this separator there are recognized improvement in the permeability of nonaqueous electrolytic solution into the separator structure, fluid retention characteristics and the capacitor assembly process, but there still remains difficulty with the capacitors that vaporization of the nonaqueous electrolytic solution can not yet be prevented.

Technology for an electric double layer capacitor employing, as a microporous separator which prevent the passage of carbon particles, bacterial cellulose obtained from an acetic acid bacteria stationary culture is disclosed in Japanese Patent Laid-open Publication No. Hei 9-129509. A major feature of this capacitor is the use of cellulose with a microfilament mesh structure as the separator. However, in case of capacitors employing this separator it is possible to prevent the passage of carbon particles, but there is still difficulty that the evaporation of the aqueous electrolytic solution can not be prevented.

Developments in electric double layer capacitors without these kinds of problems are in progress and there has been used technologies for solidifying nonaqueous electrolytic solution in particular for forming the nonaqueous electrolytic solution into a gel using as gelling agents polymers of polyacrylonitrile or acrylonitrile and (meta) acrylate. The polymer gel electrolyte obtained by heating and dissolving the acrylonitrile based polymer into the nonaqueous electrolytic solution and followed by cooling the same exhibits good ionic conduction, fluid retention and prevention of the passage of carbon particles, but the gel electrolyte shows high tackiness and thereby pausing difficulty in handling, whereby the assembly of electric double layer capacitors using this gel electrolyte faces therefore many difficulties and the manufacture of high-performance electric double layer capacitors becomes extremely difficult.

DISCLOSURE OF THE INVENTION

The inventors carried out investigations with the object of manufacturing in an efficient manner a high-performance electric double layer capacitor by improving the handling characteristics of each part in an assembly step, wherein the nonaqueous electrolytic solution does not evaporate, the prevention of the passage of carbon particles is good, and the capasitor is safe, and wherein the characteristics of impregnation and liquid retention for nonaqueous electrolytic solution are good. The inventors then found from the results that this object can be achieved by using as a carrier of the nonaqueous electrolytic solution a fibrous sheet-like substance comprising mainly a fiber-like substance or pulp-like substance of organic polymer soluble in the nonaqueous electrolytic solution and having gel-forming properties, and thereby completing the present invention. The gist of the invention is directed to an electric double layer capacitor with a polymer gel electrolyte layer interposed between polarizable electrodes, and is characterized in that an electrolyte is used wherein a fibrous sheet, comprising mainly a fiber-like or pulp-like material of an organic polymer which is soluble in or swellable by a nonaquerous electrolytic solution to form a gell, with a nonaquerous electrolytic solution and thereafter a part of the fibrous sheet is dissolved or swollen to give a gel.

BEST MODE FOR CARRYING OUT THE INVENTION

The fiber-like or pulp-like material to be used in the practice of the present invention has a shape similar in appearance to a fiber of about 1 to 100 μm in apparent diameter and a length of approximately 5 mm or less may be preferably used. A fibrous sheet-like material formed from a fiber-like or pulp-like material having the apparent diameter which is too small in apparent diameter is not preferable because it shows insufficient strength or insufficient handling characteristics. On the other hand, in the case of a fibrous sheet-like material formed from a fiber-like or pulp-like material which is too large there is manifested low impregnating ability, solubility and swelling properties, and thus it is low in the ability to be formed into a polymer gel electrolyte layer with good performance characteristics. In the case of a fibrous sheet-like material formed from a fiber-like or pulp-like material which is long in a longitudinal direction, it is also difficult to make the fibrous sheet-like material to have an even thickness. It is possible to use a material having a large number of fibril for the fiber-like or pulp-like material used in the present invention, and the fibrous sheet formed from the fiber-like or pulp-like material has the advantage of good mechanical strength and an excellent impregnation characteristic under nonaqueous electrolytic solution.

These fiber-like or pulp-like materials may be made by subjecting polymers that are soluble in or undergo swelling in the nonaqueous electrolyte to melt spinning techniques, wet spinning techniques, flush spinning techniques, or ejection coagulation fiber forming techniques and the like for organic solvent solutions of polymers.

Further, pulp-like material, monofilament-like material, side-by-side type composite fiber, true conjugate composite fiber, sea-island type composite fiber, or spliced fiber of composite fibers may be employed in terms of the fiber configuration. As for the composite fibers, there may be used composite fibers of some polymers that are soluble in nonaqueous electrolytic solution or composite fibers of a polymer soluble in nonaqueous electrolytic solution and a polymer insoluble in nonaqueous electrolytic solution.

Polyacrylonitrile, polymethacrylonitrile, acrylonitrile/vinyl acetate copolymers, acrylonitrile/(meta)acrylate copolymers, acrylonitrile/vinyl chloride copolymers, acrylonitrile/methacrylonitrile copolymers, polymethyl methacrylate, vinylidene fluoride/hexafluoro propylene copolymers, polyethylene oxide, polypropylene oxide, ethylene oxide/propylene oxide block copolymer, polyvinylacetate, and acetylated cellulose may be given as polymers to be used in the practice of that are soluble in or have swelling properties under the nonaqueous electrolytic solution. Among these polymers, polymers comprising 50% or more by weight of polymer units of acrylonitrile preferably 60% or more by weight, may be preferable from the viewpoint of handling characteristics, ability to carry and retain the nonaqueous electrolytic solution, and gel-forming ability.

In case of a fibrous sheet-like material to be used in the practice of the present invention, there may be used a pulp-like or short fiber-like material comprising a polymer soluble in a nonaqueous electrolytic solution, a non-woven fabric or paper-like sheet formed by adding thereto fibers or pulp made of polymers that are insoluble in a nonaqueous electrolytic solution, or a material obtained by attaching by mutual entanglement the above short fiber-like or pulp-like material into a woven structure of woven material made from fiber comprising polymers which are insoluble in a nonaqueous electrolytic solution.

Natural pulp, polyethelene pulp, aromatic polyamide pulp, polypropylene pulp or polyolefine fiber, polyfluro vinylidene based fiber, aromatic polyamide fiber, polyphenylene sulfide fiber, polysulfone fiber, ceramic fiber, or glass fiber, etc., may be used for the fiber or pulp which is insoluble in the nonaqueous electrolytic solution when the fibrous sheet-like material is formed to be used in the present invention.

It is preferable for the fibrous sheet used in the practice of the present invention to include 50% by weight or more of fiber-like or pulp-like material comprising polymers soluble in or swelling by the nonaqueous electrolytic solution. Fibers or pulp comprising polymers which are insoluble in the nonaqueous electrolytic solution or natural materials, the fibers or pulp being included in the fibrous sheet-like material are components greatly contributing in the increase of the strength of a gel electrolyte sheet made using this fibrous sheet-like material.

The porosity of the fibrous sheet-like material to be employed in practicing the present invention is preferably in the range of 20 to 80% by volume, because the impregnation characteristic of the fiber sheet-like material by the nonaqueous electrolytic solution is improved, and whereby a nonaqueous electrolytic polymer gel layer with uniform characteristics is formed.

As for examples of the nonaqueous electrolytic solution used in the practice of the present invention, there may be found aprotic polar solvents with a high dielectric constant or a low viscosity, or organic solvents or mixtures thereof which are electrochemically stable and which will readily dissolve the electrolyte salts described below. Examples of the above may be found in; carbonates, such as propylene carbonate (PC), ethylene carbonate (EC), dimethyl carbonate, diethyl carbonate, ethyl methyl carbonate (EMC), etc.; lactones, such as γ-buytylolactone (BL), amide based solvents, such as dimethyl formamide (DMF), dimethyl acetimide (DMAC), etc.; and sulfolane, acetonitrile, dimethyl sulfoxide (DMSO), tetrahydrofuran, or dimethoxyethane and the like. Examples of electrolyte salts may preferably found in quaternary alkylammonium salts as an electrolyte in a nonaqueous solution, and as a specific example such salt having the structure $(R_4N)^+(M)^-$ may be used. Examples of alkyl groups, represented by R, may be found in methyl, ethyl and butyl groups and the like, and examples of the anion component M may be found in tetrafluoroborate ($BF_4$), and perchlorate ($ClO_4$) groups and the like The electric double layer capacitor of the present invention is made by the steps of housing the fibrous sheet-like material of the present invention in a container while the fibrous sheet-like material is being sandwiched between polarizable electrodes, injecting the container with nonaqueous electrolytic solution, preferably at reduced pressure thereby causing the fibrous sheet-like material to be sufficiently impregnated by the nonaquerous electrolytic solution, and causing at least one part of the fibrous sheet-like material to be dissolved or swelled, followed by causing the part to form a gel.

The lamination of the polarizable electrodes and the fibrous sheet-like material for forming a polymer gel electrolyte layer can be handled with these raw materials in a noncohesive state, and thus the rate of occurrence of defects in the process of assembling the capacitor can be kept low.

The impregnation of the nonaqueous electrolytic solution into the fibrous sheet-like material can utilize the capillary phenomenon based on the fiber structure, and thus, the nonaqueous electrolytic solution rapidly impregnates the fibrous sheet-like material, and there occurs almost no area of unimpregnation, thereby making it possible to provide capacitor equipped with a polymer gel electrolyte layer with almost no microvoids.

EXAMPLES

The present invention is further explained in detail with reference to the following examples.

Comparison 1

A fibrous sheet-like material is made in the following manner. Water based suspension polymerization is carried out using as a polymer catalyst 1.0 wt % of $Na_2SO_3$, 1.5% by weight of $NaHSO_3$, and 0.12% by weight of $H_2SO_4$ with respect to the reactant prepared from 93.6% by mole of acrylonitrile units and 6.4% by mole of vinyl acetate units under the conditions of a water to monomer ratio being of 14/1 in a 2000 milliliter glass reaction container with a jacket. The reaction temperature was kept at 55° C. The polymerized material produced within the reaction container was then recovered, followed by thoroughly washing and dying to have a white powder. A reaction yield of 73% was calculated from the weight of the powder thus obtained.

The analysis of component by element analysis of the polymer thus obtained showed an introduction of 96.0% by mole of acrylonitrile units and 4.0% by mole of vinyl acetate units. The molecular weight of the polymer was shown to be $5.1 \times 10^5$ by polystyrene conversion measured using GPC. This GPC measurement was carried out at a polymer concentration of 0.1 g/dl using 0.1MLiCl/DMF as a solvent.

An electrolytic solution where $LiPF_6$ was dissolved as an electrolyte in propylene carbonate so as to give 1.0 mol/kg of $LiPF_6$, and the acrylonitrile based copolymer was added to the electrolytic solution at room temperature to give a slurry. This slurry was then agitated at 100° C., and the polymer was dissolved to give a homogenous solution. The polymer concentration in this solution was 16% by weight. When this solution was left at room temperature for 24 hours, the solution lost liquidity to become a resilient cloudy white gel.

This acrylonitrile copolymer was dissolved in dimethyl acetamide to give a polymer solution with a concentration of 18% by weight. This polymer solution was then spread on a slide glass so as to produce a cast film by natural drying of the solvent. Contact angles were calculated for the propylene carbonate and dimethyl carbonate with respect to the smooth surface of the cast film and the affinity between the film and the droplets was good and the measurements were impossible because of the liquid droplet spreading out on the film.

The the polymer solution was discharged into water of a temperature of 30° C. at a supply rate of the polymer solution being 18 milliliters per minute and under the pressure of supplying the water steam being 1.5 kg/cm$^2$, following the method disclosed in Japanese Patent Laid-open Publication No. Hei 9-241917, and using nozzle wherein the nozzle had a solution discharge opening with a diameter of 0.2 mmφ, a cylindrical mixing cell portion with a diameter of 0.2 mmφ and a length of 1.5 mm, and the nozzle being made in such a manner that a water steam passage opens in a slit-shape and is regulated to 250 μm, and an angle between a center line of a solution passage and a slit center line was 60 degrees to obtain an agglomeration of pulp-like polymers.

This agglomeration of pulp-like polymer was dispersed in water and beaten and loosened for ten minutes in a household mixer. After this beating and loosening, the dispersed solution in water was partially separated, and the shape of the fiber-like or pulp-like material obtained after drying is monitored using a scanning electron microscope to reveal a structure where a large number of fibril-like fibers having diameters about from 0.2 μm to 1 μm diverge from a fiber-like trunk having diameters of 5 to 20 μm. The filtration value of the fiber-like or pulp-like material was measured based on JIS P-8207 by using a canadian freeness tester. The filtration value was 387 milliliters after compensation to a standard temperature of 20° C. and a standard concentration of 0.3%.

Wet process paper preparation conforming to JIS P-8209 and using a standard rectangular sheet machine was then carried out by using the dispersion solution in water of the fiber-like or pulp-like materials. The weight of the fibrous sheet-like material formed from polyacryl nitrile based copolymer thus obtained was 25 g/m$^2$ and the average sheet thickness was measured at 155 μm by following JIS P-8118. The sheet was then cut into rectangular pieces to obtain test samples, and the sample was evaluated for tensile strength based on JIS P-8113. The sample with the width of 15 mm showed a failure strength of 18N/15 mm. The porosity for this sheet was measured to be 68% using a mercury porosimeter (CARLO ERBA INSTRUMENTS, POROSIMETER 4000).

Comparison 2

A fibrous sheet-like material was prepared by using the following method.

A 10 parts by weight of fiber-like or pulp-like material of acrylonitrile copolymer having a tiltration value of 387 milliliters and being made in comparison 1 and a 10 parts by weight of pulp-like polypropylene (Mitsui Chemical SWP Y600) were mixed and a sheet was prepared by using a wet paper preparation technique from a dispersion solution of this mixture in water.

The weight of the sheet was 25 g/m$^2$, the sheet thickness was 140 μm, the tensile strength was 21N/15 mm, and the porosity was 72%, where this sheet was used as a porous sheet for forming polymer gel electrolyte.

A nonaqueous electrolytic solution was prepared wherein tetraethyl ammonium tetrafluoroborate (TEAFB) was obtained as an electrolyte salt to a concentration of 0.8 mol/liter in a nonaqueous solvent comprising a mixed solvent where PC/EC=20/80 (specific volume).

After the fibrous sheet-like material prepared in comparison 1 was soaked with the electrolytic solution thus obtained, the sheet-like material was heated to a temperature of 100° C. and then cooled down to room temperature. After the cooling, the sheet was in the state of a gel-like sheet having some adhesiveness wherein the fiber-like or pulp-like material was substantially dissolved. The thickness of this film was 50 μm, and conductivity was measured to be $3.0 \times 10^{-3}$ S/cm at 25° C.

Gel sheets were also prepared similarly to the above manner except that the sheet prepared in comparison 2 was used. In this case of the gel-like sheet with adhesiveness after the cooling, polypropelene fibers that did not dissolve in the solvent were present in a mesh-like form within the gel. This thickness of this sheet was 30 μm, but this provided sufficient strength. Conductivity was $2.0 \times 10^{-3}$ S/cm.

Example 1

The nonaqueous electrolytic solution used in comparison 2 was prepared. The fibrous sheet-like material prepared in comparison 1 was interposed between two sheets of electrodes wherein each electrode was prepared by welding as a collector a nickel mesh onto a non-woven cloth comprising activated carbon fibers and the assembly was inserted into a button-shaped sealed container to prevent short-circuits between the electrodes.

The sealed container is provided beforehand with an injection inlet for an electrolytic solution, and after degassing of gas under a vacuum operation, the electrolytic solution was injected, followed by closing the opening with a sealant. The container is then heated to 100° C. and then allowed to cool to room temperature. The capacitance of this capacitor was 0.35 F/cm$^2$ at a final charge potential of 2 V, a final discharge potential of 1 V, and a charging and discharging current of 1 mA.

Example 2

When an electric double layer capacitor was made by the same method as for the example 1 except that a fibrous sheet-like material obtained in comparison 2 was used, the performance was 0.20 F/cm$^2$. The process for assembling the capacitor was extremely easy and no problems caused by the adhesiveness of the gel electrolyte occurred during the assembly process of the capacitor.

Industrial Applicability

According to the present invention, by employing as a carrier of a nonaqueous electrolytic solution a fibrous sheet-like material comprising mainly a fiber-like or pulp-like material formed from organic polymers being soluble in a nonaqueous electrolytic solution and having gel-forming properties, it was made possible to manufacture in an efficient manner a high-performance electric double layer capacitor by increasing the ease of handling each component in the assembly process wherein there is no vaporization of the nonaqueous electrolytic solution, the prevention characteristic of the penetration of carbon fine particles is good, the safety is improved, and the impregnation and liquid retention of the nonaqueous electrolytic solution is good, and thus, the industrial implications of the invention are substantial.

What is claimed is:

1. An electric double-layer capacitor, comprising a polymer gel electrolyte layer provided between polarizable electrodes,
   wherein the polymer gel electrolyte layer comprises a nonaqueous electrolytic solution, and a fibrous sheet material comprising mainly a fiber or pulp material capable of forming a polymer gel with a nonaqueous electrolytic solution.

2. The electric double-layer capacitor of claim 1, wherein the porosity of the fibrous sheet material is 20 to 80% by volume.

3. The electric double-layer capacitor of claim 2, wherein the fiber or pulp material comprises polymer units of acrylonitrile and vinyl acetate.

4. The electric double-layer capacitor of claim 1, wherein the fibrous sheet material comprises 50% by weight or more of a fiber or pulp material capable of forming a polymer gel by the nonaqueous electrolytic solution.

5. The electric double-layer capacitor of claim 1, wherein the fiber or pulp material is at least partially dissolved or swollen by the nonaqueous electrolytic solution to cause the polymer gel to be formed.

6. The electric double-layer capacitor of claim 1, wherein the fiber or pulp material comprises 50% by weight or more of polymer units of acrylonitrile.

7. The electric double-layer capacitor of claim 6, wherein the fiber or pulp material comprises 60% by weight or more of polymer units of acrylonitrile.

8. The electric double-layer capacitor of claim 6, wherein the fiber or pulp material further comprises polymer units of vinyl acetate, (meth)acrylate, vinyl chloride or (meth)acrylonitrile.

9. The electric double-layer capacitor of claim 1, wherein said nonaqueous electrolyte solution comprises an aprotic, polar organic solvent comprising carbonates, lactones, amides, sulfolane, acetonitrile, dimethyl sulfoxide, tetrahydrofuran or dimethyoxyethane; and a quaternary ammonium salt as an electrolyte.

10. The electric double-layer capacitor of claim 9, wherein said quaternary ammonium salt has the formula:

wherein R is lower alkyl, and M is $(BF_4)^-$ or $(ClO_4)^-$.

11. The electric double-layer capacitor of claim 10, wherein said quaternary ammonium salt is tetraethyl ammonium tetrafluoroborate.

12. A method of manufacturing an electric double-layer capacitor comprising the steps of:
   a) housing a laminate in a container, and interposing a fibrous sheet material comprising mainly a fiber or pulp material capable of forming a polymer gel by nonaqueous electrolytic solution between polarizable electrodes; and
   b) impregnating the fibrous sheet with a nonaqueous electrolytic solution; and causing at least one part of the fiber sheet material to form a polymer gel.

13. The method of claim 12, wherein the porosity of the fibrous sheet material is 20 to 80% by volume.

14. The method of claim 12, wherein the fibrous sheet material comprises 50% by weight or more of a fiber or pulp material capable of forming a polymer gel by the nonaqueous electrolytic solution.

15. The method of claim 12, wherein the fiber or pulp material is at least partially dissolved or swollen by the nonaqueous electrolytic solution to cause the polymer gel to be formed.

16. The method of claim 12, wherein the fiber or pulp material comprises 50% by weight or more of polymerization units of acrylonitrile.

17. The method of claim 16, wherein the fiber or pulp material comprises 60% by weight or more of polymer units of acrylonitrile.

18. The method of claim 16, wherein the fiber or pulp material further comprises polymer units of vinyl acetate, (meth)acrylate, vinyl chloride or (meth)acrylonitrile.

19. The method of claim 18, wherein the fiber or pulp material comprises polymer units of acrylonitrile and vinyl acetate.

20. The method of claim 16, wherein said nonaqueous electrolyte solution comprises an aprotic, polar organic solvent comprising carbonates, lactones, amides, sulfolane, acetonitrile, dimethyl sulfoxide, tetrahydrofuran or dimethyoxyethane; and a quaternary ammonium salt as an electrolyte.

21. The method of claim 20, wherein said quaternary ammonium salt has the formula:

wherein R is lower alkyl, and M is $(BF_4)^-$ or $(ClO_4)^-$.

22. The method of claim 21, wherein said quaternary ammonium salt is tetraethyl ammonium tetrafluoroborate.

* * * * *

UNITED STATES PATENT AND TRADEMARK OFFICE
CERTIFICATE OF CORRECTION

PATENT NO.    : 6,392,867 B1
DATED         : May 21, 2002
INVENTOR(S)   : Yamada et al.

It is certified that error appears in the above-identified patent and that said Letters Patent is hereby corrected as shown below:

<u>Title page,</u>
Item [22], the PCT information should read -- (22)    PCT filed:    May 12, 1999 --

Signed and Sealed this

Fifteenth Day of October, 2002

Attest:

Attesting Officer

JAMES E. ROGAN
*Director of the United States Patent and Trademark Office*